United States Patent
Namikawa

(10) Patent No.: US 9,823,390 B2
(45) Date of Patent: Nov. 21, 2017

(54) OPTICAL SHEET AND EDGE-LIT BACKLIGHT UNIT

(71) Applicant: KEIWA INC., Osaka (JP)

(72) Inventor: Yoshitada Namikawa, Osaka (JP)

(73) Assignee: KEIWA INC., Osaka (JP)

( * ) Notice: Subject to any disclaimer, the term of this patent is extended or adjusted under 35 U.S.C. 154(b) by 203 days.

(21) Appl. No.: 14/794,075

(22) Filed: Jul. 8, 2015

(65) Prior Publication Data

US 2016/0011339 A1    Jan. 14, 2016

(30) Foreign Application Priority Data

Jul. 9, 2014  (JP) ................................ 2014-141574
Jun. 29, 2015 (JP) ................................ 2015-129624

(51) Int. Cl.
| | | |
|---|---|---|
| *G02B 1/18* | (2015.01) | |
| *G02B 1/16* | (2015.01) | |
| *F21V 8/00* | (2006.01) | |
| *G02B 5/02* | (2006.01) | |

(52) U.S. Cl.
CPC ............. *G02B 1/16* (2015.01); *G02B 5/0226* (2013.01); *G02B 6/0036* (2013.01); *G02B 6/0051* (2013.01); *G02B 6/0088* (2013.01); *G02B 6/0031* (2013.01); *G02B 6/0073* (2013.01)

(58) Field of Classification Search
CPC .... G02B 5/021; G02B 5/0226; G02B 5/0242; G02B 1/16; G02B 6/0051; G02B 6/0036
USPC ........................................................ 349/65
See application file for complete search history.

(56) References Cited

U.S. PATENT DOCUMENTS

| | | | |
|---|---|---|---|
| 6,606,133 B1* | 8/2003 | Okabe ................. | G02B 5/0215 349/112 |
| 2005/0068628 A1* | 3/2005 | Masaki ............... | G02B 5/0226 359/599 |
| 2011/0176089 A1* | 7/2011 | Ishikawa ............. | G02B 6/0018 349/65 |

FOREIGN PATENT DOCUMENTS

| | | |
|---|---|---|
| JP | 2000-225892 | 8/2000 |
| JP | 2007178792 A | 7/2007 |
| JP | 2009-105066 | 5/2009 |
| JP | 2010153257 A | 7/2010 |
| JP | 2011-126274 | 6/2011 |
| KR | 1020110055461 A | 5/2011 |
| TW | 201001012 | 1/2010 |
| TW | 201131210 | 9/2011 |
| TW | 201243002 | 11/2012 |

* cited by examiner

*Primary Examiner* — Karabi Guharay
(74) *Attorney, Agent, or Firm* — Norris McLaughlin & Marcus, P.A.

(57) ABSTRACT

An optical sheet includes: a transparent substrate sheet; and a sticking preventive portion provided on the back face of the transparent substrate sheet. The sticking preventive portion includes a plurality of printed dots. The average diameter of the printed dots is preferably no less than 1 μm and no greater than 200 μm. The ratio of the average height to the average diameter of the printed dots is preferably no less than 1/100 and no greater than 1. The printed dot preferably has a hemisphere-like shape having a height less than a diameter. The arrangement density of the printed dots on the back face of the substrate sheet is preferably no less than 10 dots/mm² and no greater than 2,500 dots/mm². A principal component of the printed dots is preferably is preferably an acrylic resin, a urethane resin or an acrylic urethane resin.

9 Claims, 6 Drawing Sheets

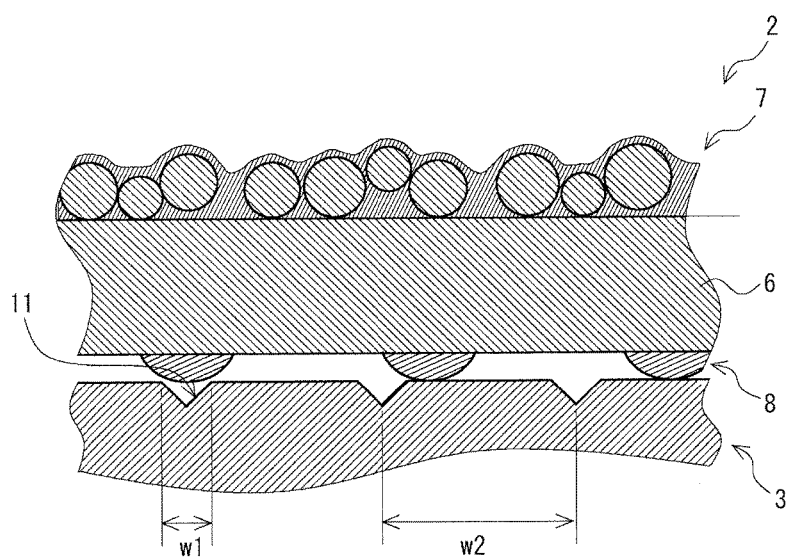
F I G. 2

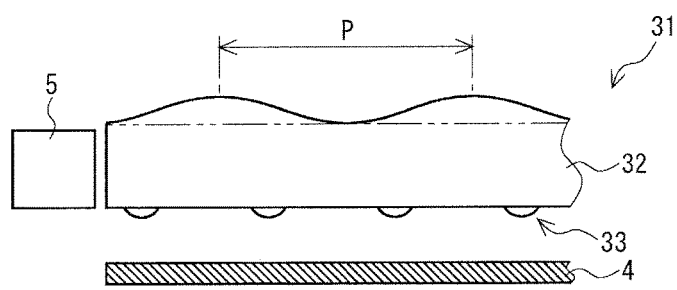
F I G. 5

OPTICAL SHEET AND EDGE-LIT BACKLIGHT UNIT

FIELD OF THE INVENTION

The present invention relates to an optical sheet and an edge-lit backlight unit.

BACKGROUND OF THE INVENTION

Backlight systems, which illuminate a liquid crystal layer from behind, are in widespread use as a transmissive liquid crystal display device, and the transmissive liquid crystal display device is equipped with an edge-lit (side-lit) backlight unit, an immediate beneath type backlight unit or the like on the back face side of the liquid crystal layer. As shown in FIG. 6(a), such an edge-lit backlight unit 41 is generally equipped with a light source 42, an optical waveguide plate 43 in the form of a rectangular plate arranged with its edge aligned with the light source 42, and a plurality of optical sheets 44 superposed on the front face side of the optical waveguide plate 43. LEDs (light emitting diodes), cold-cathode tubes and the like are used as the light source 42, and the LEDs are currently in widespread use from the viewpoint of the size reduction, energy saving, and the like. In addition, as the optical sheet 44, (1) a light diffusion sheet 45 which is disposed on the front face side of the optical waveguide plate 43 and primarily has a light diffusion function, (2) a prism sheet 46 which is disposed on the front face side of the light diffusion sheet 45 and has a refraction function toward a normal direction, and the like are utilized.

The light diffusion sheet 45 substantially uniformly disperses transmitted rays of light, and is used for the purpose of achieving uniform luminance by means of the light diffusibility thereof, increasing the luminance along the front direction, etc. As shown in FIG. 6(b), such a light diffusion sheet 45 includes a substrate layer 47 made of a synthetic resin, a light diffusion layer 48 overlaid on the front face of the substrate layer 47, and a sticking preventive layer 49 overlaid on the back face of the substrate layer 47. The sticking preventive layer 49 prevents an inconvenience that a moire screen pattern is generated through sticking (adhesion) of the back face of the light diffusion sheet 45 to the front face of the optical waveguide plate 43. The sticking preventive layer 49 generally includes: spherical beads 50; and a binder 51 that covers the beads 50 and contains a thermosetting resin, and prevents the sticking thereof to the optical waveguide plate 43 by way of protruding portions that are generated so as to protrude toward the back face side due to the presence of the beads 50.

Acrylic resin beads are generally used as the beads 50 (see Japanese Unexamined Patent Application, Publication No. 2011-126274). However, since the acrylic resin beads are comparatively hard, the beads 50 protruding from the binder 51 toward the back face may scratch the front face of the optical waveguide plate 43 overlaid on the back face side of the light diffusion sheet 45. Moreover, the beads 50 may detach during processing of the light diffusion sheet 45 so as to have a shape in accordance with the design of the backlight unit 41, and the detached bead(s) 50 are/is likely to rub against the light diffusion sheet 45 and the optical waveguide plate 43, whereby the back face of the light diffusion sheet 45 and/or the front face of the optical waveguide plate 43 are/is likely to be scratched. Furthermore, in a case where given recessed portions are provided on the front face of the optical waveguide plate 43, the beads 50 are likely to fall into the recessed portions, and the contact of the recessed portions with the beads 50 is likely to generate scratches on the front face of the optical waveguide plate 43. Moreover, when the scratches are thus generated on the front face of the optical waveguide plate 43, an inconvenience that these scratches are likely to cause lack in uniformity of the luminance may be raised.

PRIOR ART DOCUMENTS

Patent Document 1: Japanese Unexamined Patent Application, Publication No. 2011-126274

SUMMARY OF THE INVENTION

The present invention was made in view of the foregoing circumstances, and it is an object of the present invention to provide an optical sheet that can inhibit scratches of the optical sheet and/or other member disposed on the back face side, while sticking of the optical sheet to the other member is prevented. It is another object of the present invention to provide an edge-lit backlight unit that includes the aforementioned optical sheet.

According to an aspect of the present invention made for solving the aforementioned problems, an optical sheet includes: a transparent substrate sheet; and a sticking preventive portion provided on the back face of the transparent substrate sheet, the sticking preventive portion including a plurality of printed dots.

According to the optical sheet, since the sticking preventive portion is provided on the back face of the substrate sheet, and the sticking preventive portion includes the plurality of printed dots, the optical sheet abuts other member disposed on the back face side by way of the plurality of printed dots. Therefore, the sticking of the optical sheet to the other member disposed on the back face side can be prevented. Moreover, since the sticking of the optical sheet is prevented by virtue of the plurality of printed dots, scratches of the substrate sheet of the optical sheet and/or the other member, which may be caused by detachment of beads, can be inhibited (i.e., the optical sheet has a scratch-inhibiting ability), unlike conventional sticking preventive layers in which the beads are dispersed in a binder.

The average diameter of the printed dots is preferably no less than 1 μm and no greater than 200 μm. Thus, printed dots having sufficient sticking-preventing performances and adhesion strength can be formed easily and certainly.

The ratio of the average height to the average diameter of the printed dots is preferably no less than 1/100 and no greater than 1. Thus, the printed dots having sufficient sticking-preventing performances and adhesion strength can be formed easily and certainly.

The printed dot preferably has a hemisphere-like shape having a height less than the diameter. Thus, the printed dots having sufficient sticking-preventing performances and adhesion strength can be formed easily and certainly.

The arrangement density of the printed dots on the back face of the substrate sheet is preferably no less than 10 dots/mm$^2$ and no greater than 2,500 dots/mm$^2$. Thus, the optical sheet can exhibit favorable sticking-preventing performances by virtue of the plurality of printed dots.

A principal component of the printed dots is preferably an acrylic resin, a urethane resin or an acrylic urethane resin. Thus, the printed dots are likely to be formed accurately.

It is preferred that the substrate sheet includes a substrate layer, and a functional layer provided on the back face of the substrate layer, and that the printed dots are provided on the back face of the functional layer. Thus, since the substrate layer has the functional layer provided on the back face thereof, and hence is not directly exposed, scratches of the substrate layer can be inhibited.

The functional layer is preferably an antistatic layer. Thus, scratches on the front face of the other member, which may be caused by attachment of an unwanted substance, can be inhibited, whereby the scratch-inhibiting ability can be further improved.

It is preferred that the optical sheet further includes a light diffusion layer overlaid on the front face side of the substrate sheet, and that the light diffusion layer contains a light diffusing agent and a binder for the light diffusing agent. Thus, the rays of light having entered from the back face side are enabled to be diffused and to exit from the front face side substantially uniformly.

The average height of the printed dots is preferably greater than the mean particle diameter of the light diffusing agent. Thus, specular reflection on the back face can be inhibited by virtue of the sticking preventive portion, and additionally rays of light from the back face can be efficiently introduced, and the rays of light thus introduced can be allowed to be diffused by the light diffusion layer, and to exit from the front face side.

The average diameter of the printed dots is preferably no less than twice and no greater than twenty times the mean particle diameter of the light diffusing agent. Thus, an angle of incidence of rays of light from the back face with respect to the sticking preventive portion can be properly adjusted, whereby the rays of light from the back face can be efficiently introduced.

Moreover, according to another aspect of the present invention made for solving the aforementioned problems, an edge-lit backlight unit includes: the optical sheet having the aforementioned configuration; and an optical waveguide plate disposed on the back face side of the optical sheet. Thus, according to the backlight unit, the optical sheet abuts the optical waveguide sheet by way of the plurality of printed dots, whereby the sticking of the optical sheet to the optical waveguide sheet can be prevented.

The optical waveguide plate preferably includes a plurality of recessed portions provided substantially parallel on the front face. Thus, light guiding properties of the optical waveguide plate along a direction of the arrangement of the recessed portions may be improved, and consequently the backlight unit can easily and certainly achieve uniformity of light emission in a plane direction.

The average diameter of the printed dots is preferably no less than the average width of the recessed portions. Thus, the printed dots can be inhibited from falling into the recessed portions, and consequently the optical sheet can more certainly exhibit the sticking-preventing function by virtue of the printed dots.

Moreover, the optical sheet may be an optical waveguide sheet for use in an edge-lit backlight unit that emits toward the front face thereof, rays of light having entered from an end face. When the optical sheet is thus an optical waveguide sheet for use in an edge-lit backlight unit, sticking of the optical sheet to other member disposed on the back face side of the optical sheet, such as a reflection sheet or a top plate, can be prevented. In addition, since the sticking of the optical sheet is prevented by virtue of the plurality of printed dots, scratches of the front face of the reflection sheet, the top plate or the like, which may be caused by detachment of beads, can be inhibited, unlike conventional sticking preventive layers in which the beads are dispersed in a binder.

The printed dots preferably contain a white pigment. Thus, the rays of light having entered from an end face are enabled to propagate through the substrate layer, to be efficiently diffused by means of the plurality of printed dots, and to exit from the front face side.

The substrate sheet preferably has a wave-like finely modulated structure on the front face. Thus, light guiding properties and diffusing properties or light emission properties are enhanced, and a decrease of the luminance of the rays of light exiting from the front face of the optical sheet and a decrease of uniformity thereof can be suppressed. Specifically, in a case where a direction along ridges (hereinafter, may be also referred to as "ridge direction") of the finely modulated structure of the optical sheet and an incident direction of the rays of light are fixed substantially parallel to each other, light guiding properties for the incident rays of light can be improved due to the likeliness of the transmitted rays of light to be condensed along the ridge direction by virtue of the wave-like finely modulated structure; and additionally, diffusing properties of the outgoing rays of light can be improved since the rays of light exiting from the front face are diffused to some extent in a direction perpendicular to the ridge direction through refraction on the wave-like finely modulated structure. On the other hand, in a case where the ridge direction of the finely modulated structure of the optical sheet and the incident direction of the rays of light are fixed substantially perpendicular to each other, the light emission properties from the front face can be improved due to a variation of angles of incidence of the rays of light onto the front face by virtue of the wave-like finely modulated structure.

Further, according to still another aspect of the present invention made for solving the aforementioned problems, an edge-lit backlight unit includes: the optical sheet according to the aspect of the present invention; the optical sheet being an optical waveguide sheet for use in an edge-lit backlight unit. Thus, according to the backlight unit, the optical sheet abuts other member disposed on the back face of the optical sheet by way of the plurality of printed dots, and consequently the sticking of the optical sheet on the back face thereof can be prevented.

It is to be noted that the term "front face side" as referred to herein means a viewer side of a liquid crystal display device, whereas the term "back face side" as referred to herein means the other side of the viewer side. The "diameter" of a printed dot as referred to means a median value between the maximum diameter and the minimum diameter at the bottom of the printed dot (a plane in contact with the substrate sheet). The "average diameter" of the printed dots as referred to means an average of the diameters of 10 printed dots from among arbitrarily extracted 20 printed dots, excluding: five printed dots having a greater diameter; and five printed dots having a smaller diameter. The "average height" of the printed dots as referred to means an average of the heights of arbitrary 10 printed dots. The expression that a plurality of recessed portions are "substantially parallel" as referred to implies not only being perfectly parallel, but also a state in which an angle between two lining recessed portions is no greater than 10°, preferably no greater than 5°. The "width" of the recessed portion as referred to means a value derived by dividing a value of an area of the recessed portion (an area of an aperture thereof) by the length of the recessed portion. The "average width" of the recessed portions as referred to means an average of the widths of 10 recessed portions from among arbitrarily extracted 20 recessed portions, excluding: five recessed portions having a greater width; and five recessed portions having a smaller width. The "arrangement density of printed dots" as referred to means a value obtained by counting the number of printed dots within a field of view using a laser microscope at a magnification of ×1,000, and dividing the number by a value of the area of the field of view. The "principal component" as referred to means a component contained in the greatest amount, and, for example, a component contained in an amount of no less than 50% by mass.

As explained in the foregoing, the optical sheet and the edge-lit backlight unit according to the aspects of the present invention enable scratches of the optical sheet and/or other member disposed on the back face side of the optical sheet to be inhibited, while the sticking of the optical sheet to the other member can be prevented.

BRIEF DESCRIPTION OF THE DRAWINGS

FIG. 2 is a schematic enlarged view illustrating an arrangement of the optical sheet and the optical waveguide plate of the backlight unit shown in FIG. 1;

FIG. 5 is a schematic end view illustrating an edge-lit backlight unit according to an embodiment other than the edge-lit backlight unit shown in FIG. 1(a);

DESCRIPTION OF THE PREFERRED EMBODIMENTS

Hereinafter, preferred modes for carrying out the invention will be explained in more detail with reference to the drawings, if necessary.

First Embodiment

Edge-Lit Backlight Unit

Figure 1A:
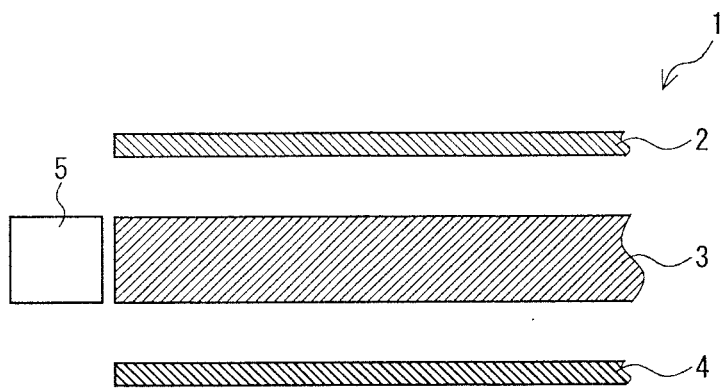
FIG. 1(a) is a schematic end view illustrating an edge-lit backlight unit according to a first embodiment of the present invention.

An edge-lit backlight unit 1 shown in FIG. 1(a) includes: an optical sheet 2; an optical waveguide plate 3; a reflection sheet 4; and a light source 5.

Optical Sheet

Figure 1B:
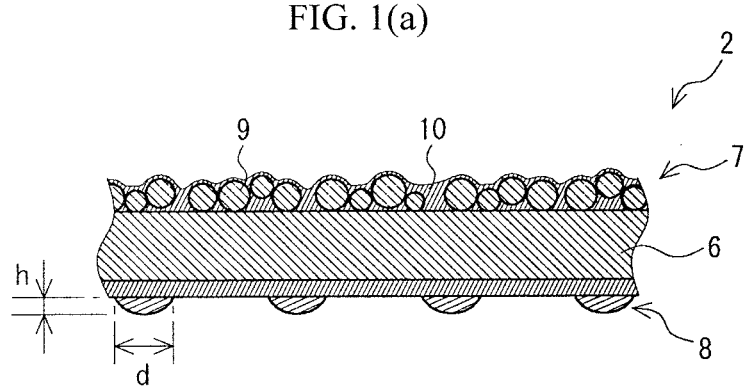
FIG. 1(b) is a schematic end view illustrating an optical sheet included in the edge-lit backlight unit.

The optical sheet 2 includes: a substrate sheet 6; a light diffusion layer 7 overlaid on the front face of the substrate sheet 6; and a sticking preventive portion 8 provided on the back face of the substrate sheet 6, as shown in FIG. 1(b).

Substrate Sheet

Since the substrate sheet 6 needs to transmit rays of light, the substrate sheet 6 is formed from a transparent, in particular colorless and transparent, synthetic resin as a principal component. The synthetic resin used for the substrate sheet 6 is not particularly limited, and examples thereof include polyethylene terephthalate, polyethylene naphthalate, acrylic resins, polycarbonate, polystyrene, polyolefin, cellulose acetate, weather resistant vinyl chloride, and the like. Of these, polyethylene terephthalate having superior transparency and strength is preferred, and polyethylene terephthalate having improved deflection performances is particularly preferred.

The lower limit of the average thickness of the substrate sheet 6 is preferably 10 µm, more preferably 35 µm, and still more preferably 50 µm. On the other hand, the upper limit of the average thickness of the substrate sheet 6 is preferably 500 µm, more preferably 250 µm, and still more preferably 188 µm. When the average thickness of the substrate sheet 6 is less than the lower limit, curling may occur when the light diffusion layer 7 and the sticking preventive portion 8 are formed through coating. To the contrary, when the average thickness of the substrate sheet 6 is greater than the upper limit, the luminance of the liquid crystal display device may be decreased, and additionally the thickness of the backlight unit 1 may be so great that it may be difficult to satisfy a requirement of a reduction in thickness of the liquid crystal display device.

Light Diffusion Layer

The light diffusion layer 7 is overlaid on the front face of the substrate sheet 6. The light diffusion layer 7 contains a light diffusing agent 9, and a binder 10 for the light diffusing agent 9. The light diffusion layer 7 contains the light diffusing agent 9 in a dispersion state with a substantially uniform density. The light diffusing agent 9 is surrounded by the binder 10. Since the light diffusion layer 7 contains the light diffusing agent 9 in a dispersion state, the light diffusion layer 7 substantially uniformly diffuses the rays of light transmitted from the back face side to the front face side. In addition, fine concave-convex shapes are substantially uniformly formed by the light diffusing agent 9 on the front face of the light diffusion layer 7, and each convex portion and each convex portion of the fine concave-convex shapes are formed in the form of a lens. The light diffusion layer 7 exhibits a superior light diffusion function due to the lens effect of such fine concave-convex shapes, and due to this light diffusion function, has a function of refracting the transmitted rays of light toward a normal direction and a function of macroscopically condensing the transmitted rays of light along the normal direction.

The light diffusing agent 9 is constituted with particles having light-diffusing properties, and is classified broadly into inorganic fillers and organic fillers. Examples of the inorganic filler include silica, aluminum hydroxide, aluminum oxide, zinc oxide, barium sulfide, magnesium silicate, and a mixture thereof. Examples of a specific material of the organic filler include acrylic resins, acrylonitrile resins, polyurethane, polyvinyl chloride, polystyrene, polyamide, polyacrylonitrile, and the like. Of these, acrylic resins having superior transparency are preferred, and polymethyl methacrylate (PMMA) is particularly preferred.

The shape of the light diffusing agent 9 is not particularly limited, and examples thereof include a spherical form, a cubic form, a needle-like form, a rod-like form, a spindle-like form, a plate-like form, a scale-like form, a fiber-like form, and the like; among these, a form of a spherical bead is preferred in light of superior light diffusibility.

The lower limit of the mean particle diameter of the light diffusing agent 9 is preferably 1 µm, more preferably 2 µm, and still more preferably 5 µm. On the other hand, the upper limit of the mean particle diameter of the light diffusing agent 9 is preferably 50 µm, more preferably 20 µm, and still more preferably 15 µm. When the mean particle diameter of the light diffusing agent 9 is less than the lower limit, the roughness (i.e., concavity and convexity) of the front face of the light diffusion layer 7, which is generated by the light diffusing agent 9, may be less significant, and consequently light diffusibility needed for light diffusion sheets may not be satisfied. To the contrary, when the mean particle diameter of the light diffusing agent 9 is greater than the upper limit, the thickness of the optical sheet 2 may be increased, and uniform diffusion may hardly occur.

The lower limit of the amount of the light diffusing agent 9 blended (the amount based on the solid content of the light diffusing agent 9 blended with respect to 100 parts by mass of a polymer component in a polymer composition which is a material for forming the binder 10) is preferably 10 parts by mass, more preferably 20 parts by mass, and still more preferably 50 parts by mass. On the other hand, the upper limit of the amount of the light diffusing agent 9 blended (the amount based on the solid content of the light diffusing agent 9 blended with respect to 100 parts by mass of a polymer component in a polymer composition which is a material for forming the binder 10) is preferably 500 parts by mass, more preferably 300 parts by mass, and still more preferably 200 parts by mass. When the amount of the light diffusing agent 9 blended is less than the lower limit, the light diffusibility may be insufficient. To the contrary, when the amount of the light diffusing agent 9 blended is greater than the upper limit, the light diffusing agent 9 may not be accurately fixed by the binder 10. It is to be noted that in a case where the optical sheet 2 is used as a light diffusion sheet for use at the top, which may be generally referred to and which is to be disposed on the front face side of a prism sheet, the lower limit of the amount of the light diffusing agent 9 blended is preferably 5 parts by mass, and more preferably 10 parts by mass, whereas the upper limit of the amount of the light diffusing agent 9 blended is preferably 40 parts by mass, and more preferably 30 parts by mass, since superior light diffusibility is not needed.

The binder 10 is prepared by curing (crosslinking, etc.) a polymer composition containing a base polymer. The binder 10 allows the light diffusing agent 9 to be arranged and fixed with a substantially uniform density on the entire front face of the substrate sheet 6. It is to be noted that, for example, a fine inorganic filler, a curing agent, a plasticizer, a dispersant, various types of levelling agents, an antistatic agent, an ultraviolet ray-absorbing agent, an anti-oxidizing agent, a viscosity modifier, a lubricant, a light stabilizer, and the like may be further blended in the polymer composition for forming the binder 10, as needed.

Sticking Preventive Portion

The optical sheet 2 includes a plurality of printed dots as the sticking preventive portion 8. In other words, according to the optical sheet 2, the sticking preventive portion 8 is constituted with the plurality of printed dots. Thus, the optical sheet 2 scatteredly abuts by way of the plurality of printed dots, the optical waveguide plate 3 superposed on the back face of the optical sheet 2, as described later. Accordingly, the sticking of the optical sheet to the optical waveguide plate 3 can be prevented. The plurality of printed dots are scatteredly arranged over the entire back face of the substrate sheet 6, and substantially uniformly arranged on the back face of the substrate sheet 6.

The plurality of printed dots contain a binder component as a principal component. The binder component is exemplified by a thermosetting resin and an active energy ray-curable resin.

Examples of the thermosetting resin include epoxy resins, silicone resins, phenol resins, urea resins, unsaturated polyester resins, melamine resins, alkyd resins, polyimide resins, acrylic resins, amide-functionalized copolymers, urethane resins, and the like.

The active energy ray-curable resin is exemplified by ultraviolet ray-curable resins that are crosslinked and cured upon irradiation with an ultraviolet ray, electron beam-curable resins that are crosslinked and cured upon irradiation with an electron beam, and the like. In addition, the active energy ray-curable resin may be appropriately selected for use from among polymerizable monomers and polymerizable oligomers. Of these, acrylic ultraviolet ray-curable resins, urethane ultraviolet ray-curable resins or acrylic urethane ultraviolet ray-curable resins are preferred as the active energy ray-curable resin. According to the optical sheet 2, when the principal component of the printed dots is an acrylic ultraviolet ray-curable resin, a urethane ultraviolet ray-curable resin or an acrylic urethane ultraviolet ray-curable resin, adhesiveness of the printed dots to the substrate sheet 6 may be improved, leading to accurate formation of the printed dots.

As the polymerizable monomer, (meth)acrylate monomers having at least one radically-polymerizable unsaturated group in a molecule thereof are suitably used, and of these, polyfunctional (meth)acrylates are preferred. The polyfunctional (meth)acrylates are not particularly limited as long as the (meth)acrylates have two or more ethylenic unsaturated bonds in a molecule thereof. Specific examples of the polyfunctional (meth)acrylates include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate, and the like. These polyfunctional (meth)acrylates may be used either alone, or in combination of two or more types thereof. Of these, dipentaerythritol tri(meth)acrylate is preferred.

Moreover, the binder component may further contain, in addition to the polyfunctional (meth)acrylate, a monofunctional (meth)acrylate for the purpose of decreasing the viscosity thereof, and the like. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used either alone, or as a mixture of two or more types thereof.

The polymerizable oligomers are exemplified by oligomers having at least one radically-polymerizable unsaturated group in a molecule thereof, and examples thereof include epoxy (meth)acrylate oligomers, urethane (meth)acrylate oligomers, polyester (meth)acrylate oligomers, polyether (meth)acrylate oligomers, and the like.

The epoxy (meth)acrylate oligomers may be prepared, for example, by reacting (meth)acrylic acid with an oxirane ring of a bisphenol-type epoxy resin or novolak-type epoxy resin having a comparatively low molecular weight, followed by esterification. Alternatively, a carboxyl-modified epoxy (meth)acrylate oligomer obtained by partially modifying the epoxy (meth)acrylate oligomer with a dibasic carboxylic anhydride may be used. The urethane (meth)acrylate oligomers may be prepared, for example, by esterifying (meth) acrylic acid with a polyurethane oligomer which can be prepared in a reaction of a polyether polyol or a polyester polyol with a polyisocyanate. The polyester (meth)acrylate oligomers may be prepared, for example, by esterifying (meth)acrylic acid with a hydroxyl group of a polyester oligomer having a hydroxyl group at both ends thereof, which may be prepared in the condensation of a polyhydric carboxylic acid with a polyhydric alcohol. Alternatively, the polyester (meth)acrylate oligomers may also be prepared by esterifying (meth)acrylic acid with a terminal hydroxyl group of an oligomer prepared by adding an alkylene oxide to a polyhydric carboxylic acid. The polyether (meth)acrylate oligomers may be prepared by esterifying (meth)acrylic acid with a hydroxyl group of a polyether polyol.

An ultraviolet ray-curable epoxy resin is also suitably used as the active energy ray-curable resin. Examples of the ultraviolet ray-curable epoxy resin include cured products of bisphenol A type epoxy resins, glycidyl ether type epoxy resins, and the like. According to the optical sheet 2, when the binder component of the plurality of printed dots contains the ultraviolet ray-curable epoxy resin, volume shrinkage thereof can be inhibited upon curing thereof, and accordingly the plurality of printed dots can be easily formed so as to have a desired shape such as a hemisphere-like shape. In addition, according to the optical sheet 2, when the binder component of the plurality of printed dots contains the ultraviolet ray-curable epoxy resin, flexibility of the plurality of printed dots may be enhanced, whereby scratch-inhibiting ability of the optical sheet 2 with respect to other member disposed on the back face of the sticking preventive portion 8 can be improved. Furthermore, when the ultraviolet ray-curable epoxy resin is used as the active energy ray-curable resin, it is preferred that other polymerizable monomer and polymerizable oligomer such as the (meth) acrylate monomer and the (meth)acrylate oligomer described above are not contained. Thus, the flexibility of the plurality of printed dots can be further improved, and hence the scratch-inhibiting ability can be further enhanced.

When the ultraviolet ray-curable resin is used as the active energy ray-curable resin, a photopolymerization initiator is preferably added in an amount of about 0.1 to about 5 parts by mass with respect to 100 parts by mass of the resin. The photopolymerization initiator is not particularly limited, and in the case of polymerizable monomers or polymerizable oligomers having at least one radically-polymerizable unsaturated group in a molecule thereof, examples of the photopolymerization initiator include benzophenone, benzil, Michler's ketone, 2-chlorothiaxanthon, 2,4-diethylthiaxanthon, benzoin ethyl ether, benzoin isopropyl ether, benzoin isobutyl ether, 2,2-diethoxyacetophenone, benzil dimethyl ketal, 2,2-dimethoxy-1,2-diphenylethan-1-one, 2-hydroxy-2-methyl-1-phenylpropan-1-one, 1-hydroxycyclohexyl phenyl ketone, 2-methyl-1-[4-(methylthio)phenyl]-2-morpholinopropanone-1,1-[4-(2-hydroxyethoxy)-phenyl]-2-hydroxy-2-methyl-1-propan-1-one, bis(cyclopentadienyl)-bis(2,6-difluoro-3-(pyrrol-1-yl)phenyl)titanium, 2-benzyl-2-dimethylamino-1-(4-morpholinophenyl)-butanone-1, 2,4,6-trimethylbenzoyldiphenylphosphine oxide, and the like. Alternatively, in the case of polymerizable oligomers and the like having at least one cationically-polymerizable functional group in a molecule thereof, examples of the photopolymerization initiator include aromatic sulfonium salts, aromatic diazonium salts, aromatic iodonium salts, metallocene compounds, benzoinsulfonic acid esters, and the like. It is to be noted that these compounds may be each used either alone, or as a mixture of a plurality of types thereof.

It is to be noted that the printed dots may contain an additive in addition to the binder component. Examples of the additive include silicone-containing additives, fluorine-containing additives, an antistatic agent, and the like. In addition, the amount of the additive based on the solid content with respect to 100 parts by mass of the binder component may be, for example, no less than 0.05 parts by mass and no greater than 5 parts by mass.

The plurality of printed dots are formed through a printing procedure using a printed dots-forming ink containing the binder component.

Examples of the printing procedure include screen printing, ink jet printing, gravure printing, offset printing, flexographic printing, dispenser printing, and the like. Of these, offset printing which enables printed dots having a small diameter to be formed highly accurately, flexographic printing which enables printed dots having a small diameter to be formed easily and accurately, and screen printing which enables tall printed dots to be easily formed through placing the ink thick are preferred.

Figure 1C:
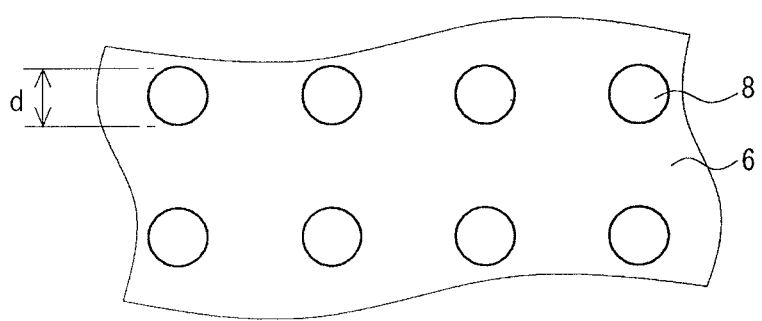
FIG. 1(c) is a schematic partial enlarged view of the back face of the optical sheet.

The printed dots are formed so as to be substantially circular when viewed from the back face side, as shown in FIG. 1(c). It is to be noted that "being substantially circular" as referred to includes not only being perfectly circular, but also having a shape that includes circular arcs continuously formed to give a round pattern, with the maximum diameter (i.e., the maximum length among the lengths of phantom straight lines passing through the center of gravity) being no greater than twice, preferably no greater than 1.5 times the minimum diameter (i.e., the minimum length among the lengths of the phantom straight lines passing through the center of gravity).

The lower limit of the average diameter (d) of the printed dots is preferably 1 µm, more preferably 3 µm, still more preferably 10 µm, and particularly preferably 20 µm. On the other hand, the upper limit of the average diameter (d) of the printed dots is preferably 200 µm, more preferably 100 µm, and still more preferably 50 µm. When the average diameter (d) of the printed dots is less than the lower limit, the adhesiveness to the substrate sheet 6 may be deteriorated. To the contrary, when the average diameter (d) of the printed dots is greater than the upper limit, the printed dots may be unnecessarily so large that optical characteristics of the backlight unit may be adversely affected.

It is to be noted that the average diameter (d) of the printed dots is preferably no less than the average width (w2) of the recessed portions 11 of the optical waveguide plate 3 described later. When the average diameter (d) of the printed dots is no less than the average width (w2) of the recessed portions 11, the printed dots can be inhibited from falling into the recessed portions 11. Thus, the optical sheet 2 can more certainly exhibit the sticking-preventing function by virtue of the printed dots. The lower limit of the ratio (d/w2) of the average diameter (d) of the printed dots to the average width (w2) of the recessed portions 11 is preferably 1.05, more preferably 1.1, and still more preferably 1.2. Thereby, the printed dots can be more certainly inhibited from falling into the recessed portions 11. It is to be noted that the upper limit of the ratio (d/w2) of the average diameter (d) of the printed dots to the average width (w2) of the recessed portions 11 is not particularly limited, and may be 3, for example.

The lower limit of the average height (h) of the printed dots is preferably 0.5 μm, more preferably 1 μm, still more preferably 3 μm, and particularly preferably 5 μm. On the other hand, the upper limit of the average height (h) of the printed dots is preferably 100 μm, more preferably 50 μm, and still more preferably 10 μm. When the average height (h) of the printed dots is less than the lower limit, the sticking may not be sufficiently inhibited. To the contrary, when the average height (h) of the printed dots is greater than the upper limit, it may be difficult to form the printed dots, leading to a reduction of productivity.

The plurality of printed dots are preferably uniform in height. More specifically, the upper limit of the coefficient of variation of the heights (h) of the printed dots is preferably 0.2, more preferably 0.1, and still more preferably 0.05. When the coefficient of variation of the heights (h) of the printed dots is greater than the upper limit, the plurality of printed dots are not uniform in height, hence uneven loading onto tall printed dot(s) may occur, and consequently scratches of the optical waveguide sheet 3 may be caused. It is to be noted that the lower limit of the coefficient of variation of the heights (h) of the printed dots is not particularly limited, and may be zero, for example. Moreover, the "coefficient of variation" of the heights of the printed dots as referred to means a value derived by dividing a standard deviation of the heights of the plurality of printed dots by the average height.

The lower limit of the height ratio (h/d) of the average height (h) to the average diameter (d) of the printed dots is preferably 1/100, more preferably 1/20, and still more preferably 1/10. When the height ratio (h/d) is less than the lower limit, the printed dots may be unnecessarily large.

In addition, the upper limit of the height ratio (h/d) of the average height (h) to the average diameter (d) of the printed dots is preferably 1. When the height ratio (h/d) is greater than the upper limit, the contact surfaces of the printed dots with other member may be tapered, and consequently the scratch-inhibiting ability of the optical sheet 2 with respect to other member disposed on the back face side of the sticking preventive portion 8 may be deteriorated. Furthermore, the upper limit of the height ratio (h/d) of the average height (h) to the average diameter (d) of the printed dots is more preferably ½, and still more preferably ⅕. Thus, a large contact area of the printed dots with the substrate sheet 6 can be ensured, leading to superior adhesiveness of the printed dots to the substrate sheet 6.

The printed dot preferably has a hemisphere-like shape, and more preferably, in particular, a flattened hemisphere-like shape in which the ratio of the height to the diameter of the flattened hemisphere-like shape is no less than 1/100 and no greater than ½. When the printed dot is formed so as to have the aforementioned flattened hemisphere-like shape, the sticking can be suitably inhibited, and additionally scratches of the optical waveguide sheet 3 can be inhibited since the abutting surface against the front face of the optical waveguide sheet 3 can be smoothly curved. The "flattened hemisphere-like shape" as referred to means a shape derived by deforming a sphere as if it is compressed along an axis direction, and cutting the compressed sphere in half along a direction perpendicular to this compression direction. The "substantially flattened hemisphere-like shape" as referred to means not only a perfect flattened hemisphere-like shape, but also a shape in which a lateral face does not include a break point, a tangent line direction at each point on the lateral face has an angle of no greater than 90° with respect to the bottom (i.e., an angle on the side of the printed dots being no greater than 90°), and a tangent line direction on the lateral face gradually becomes parallel to the bottom from the bottom toward the top.

It is to be noted that the average height (h) of the printed dots is preferably greater than the mean particle diameter of the light diffusing agent 9. In addition, the lower limit of the ratio of the heights (h) of the printed dots to the mean particle diameter of the light diffusing agent 9 is more preferably 6/5, and still more preferably 3/2. On the other hand, the upper limit of the ratio of the heights (h) of the printed dots to the mean particle diameter of the light diffusing agent 9 is preferably 4, more preferably 3, and still more preferably 2. When the ratio of the heights (h) of the printed dots to the mean particle diameter of the light diffusing agent 9 is less than the lower limit, the printed dots may be so flattened that the rays of light entering the printed dots from the back face side may not be sufficiently introduced. To the contrary, when the ratio of the heights (h) of the printed dots to the mean particle diameter of the light diffusing agent 9 is greater than the upper limit, the printed dots may be so tapered that the rays of light entering the printed dots from the back face side may not be sufficiently introduced.

The lower limit of the ratio of the average diameter (d) of the printed dots to the mean particle diameter of the light diffusing agent 9 is preferably 2, more preferably 3, and still more preferably 4. On the other hand, the upper limit of the ratio of the average diameter (d) of the printed dots to the mean particle diameter of the light diffusing agent 9 is preferably 20, more preferably 15, and still more preferably 12. When the ratio of the average diameter (d) of the printed dots to the mean particle diameter of the light diffusing agent 9 is less than the lower limit, the printed dots may be so tapered that the rays of light entering the printed dots from the back face side may not be sufficiently introduced. To the contrary, when the ratio of the average diameter (d) of the printed dots to the mean particle diameter of the light diffusing agent 9 is greater than the upper limit, the printed dots may be so flattened that the rays of light entering the printed dots from the back face side may not be sufficiently introduced.

The plurality of printed dots are substantially uniformly arranged on the back face of the substrate sheet 6, as described above. The lower limit of the average pitch of the plurality of printed dots is preferably 20 μm, more preferably 30 μm, and still more preferably 40 μm. On the other hand, the upper limit of the average pitch of the printed dots is preferably 300 μm, more preferably 150 μm, and still more preferably 70 μm. When the average pitch of the printed dots is less than the lower limit, the number of the printed dots may be so great that the optical characteristics of the backlight unit may be adversely affected. To the contrary, when the average pitch of the printed dots is greater than the upper limit, sufficient sticking-preventing effects may not be exhibited.

The lower limit of the arrangement density of the printed dots on the back face of the substrate sheet 6 is preferably 10 dots/mm$^2$, more preferably 60 dots/mm$^2$, still more preferably 100 dots/mm$^2$, and particularly preferably 200 dots/mm$^2$. On the other hand, the upper limit of the arrangement density of the printed dots on the back face of the substrate sheet 6 is preferably 2,500 dots/mm$^2$, more preferably 1,000 dots/mm$^2$, still more preferably 600 dots/mm$^2$, and particularly preferably 450 dots/mm$^2$. When the arrangement density of the printed dots is less than the lower limit, sufficient sticking-preventing effects may not be exhibited. To the contrary, when the arrangement density of the printed dots is greater than the upper limit, scratches are highly likely to be generated on the front face of other member disposed on the back face side.

Optical Waveguide Plate

The optical waveguide plate 3 is an optical member having a sheet form, and allows the rays of light emitted from the light source 5 to propagate therethrough and to exit from the front face. The optical waveguide plate 3 may be formed so as to have a substantially wedge-like shape in cross section, or may be formed so as to be in the form of a substantially plate-like optical waveguide sheet. Since the optical waveguide plate 3 needs to be transparent, the optical waveguide plate 3 is formed using a transparent, in particular colorless and transparent, resin as a principal component. Although the principal component of the optical waveguide plate 3 is not particularly limited, examples thereof include synthetic resins such as polycarbonate having superior transparency, strength and the like, and acrylic resins having superior transparency, scuff resistance. Of these, the principal component of the optical waveguide plate 3 is preferably polycarbonate. Since the polycarbonate has superior transparency and a great refractive index, total reflection is likely to occur on interfaces between the optical waveguide plate 3 and air layers (a layer formed in a gap between the optical waveguide plate 3 and the optical sheet 2 disposed on the front face side of the optical waveguide plate 3; as well as a layer formed in a gap between the optical waveguide plate 3 and the reflection sheet 4 disposed on the back face side of the optical waveguide plate 3), whereby the rays of light are enabled to propagate efficiently. In addition, since the polycarbonate has heat resistance, deterioration or the like of the optical waveguide plate 3 caused by heat generation in the light source 5 is unlikely to occur.

The optical waveguide plate 3 includes a plurality of recessed portions 11 provided substantially parallel on the front face, as shown in FIG. 2. Specifically, grooves as the recessed portions 11 are provided on the front face of the optical waveguide plate 3. Although the cross-sectional shape of a recessed portion 11 (the shape of its section vertical to an arrangement direction of the recessed portion 11) is not particularly limited, the cross-sectional shape of the recessed portion 11 is exemplified by a V shape, a U shape, a channel-shape, and the like. Of these, the cross-sectional shape of the recessed portion 11 preferably has a V shape in light of easily improved light guiding properties of the optical waveguide plate 3. The arrangement direction of the recessed portions 11 may be substantially parallel to the end face on the light source 5 side, or substantially perpendicular thereto. Since the optical waveguide plate 3 includes the plurality of recessed portions 11 provided substantially parallel on the front face, light guiding properties along the arrangement direction of the recessed portions 11 can be improved, uniformity of light emission in a plane direction of the backlight unit 1 can be easily and certainly achieved. It is to be noted that the recessed portions 11 included in the optical waveguide plate 3 may be identical to each other both in size and shape, or may be different from each other in size and/or shape.

The lower limit of the average width (w1) of the recessed portions 11 is preferably 5 μm, more preferably 10 μm, and still more preferably 20 μm. On the other hand, the upper limit of the average width (w1) of the recessed portions 11 is preferably 50 μm, more preferably 40 μm, and still more preferably 35 μm. When the average width (w1) of the recessed portions 11 is less than the lower limit, the light guiding properties of the optical waveguide plate 3 may not be sufficiently enhanced. To the contrary, when the average width (w1) of the recessed portions 11 is greater than the upper limit, desired optical characteristics may not be achieved.

The lower limit of the average interval (w2) of the recessed portions 11 is preferably 10 μm, more preferably 20 μm, and still more preferably 30 μm. On the other hand, the upper limit of the average interval (w2) of the recessed portions 11 is preferably 300 μm, more preferably 200 μm, and still more preferably 100 μm. When the average interval (w2) of the recessed portions 11 is less than the lower limit, desired optical characteristics may not be achieved. To the contrary, when the average interval (w2) of the recessed portions 11 is greater than the upper limit, the light guiding properties of the optical waveguide plate 3 may not be sufficiently enhanced. It is to be noted that the "interval" of the recessed portions 11 as referred to means a distance between one recessed portion 11 and another recessed portion 11 adjacent thereto (i.e., a distance between the centers of the recessed portions 11), and the "average interval" of the recessed portions 11 as referred to means an average of 10 values of the intervals from among values of arbitrarily extracted 20 intervals of the recessed portions, excluding five greater values and five smaller values.

The lower limit of the average depth of the recessed portions 11 is preferably 2 μm, more preferably 4 μm, and still more preferably 6 μm. On the other hand, the upper limit of the average depth of the recessed portions 11 is preferably 30 μm, more preferably 20 μm, and still more preferably 10 μm. When the average depth of the recessed portions 11 is less than the lower limit, the light guiding properties of the optical waveguide plate 3 may not be sufficiently enhanced. To the contrary, when the average depth of the recessed portions 11 is greater than the upper limit, desired optical characteristics may not be achieved. It is to be noted that the "depth" of the recessed portions 11 as referred to means a distance from the average level of the front face of the optical waveguide plate 3 to the bottom (the deepest position) of the recessed portions 11, and the "average depth" of the recessed portions 11 as referred to means an average of 10 values of the depths from among the depths of arbitrarily extracted 20 recessed portions, excluding five greater values and five smaller values.

The lower limit of the ratio of the average depth of the recessed portions 11 to the average thickness of the optical waveguide plate 3 is preferably 0.001, more preferably 0.005, and still more preferably 0.01. On the other hand, the upper limit of the ratio of the average depth of the recessed portions 11 to the average thickness of the optical waveguide plate 3 is preferably 0.15, more preferably 0.1, and still more preferably 0.05. When the ratio of the average depth of the recessed portions 11 to the average thickness of the optical waveguide plate 3 is less than the lower limit, the light guiding properties of the optical waveguide plate 3 may not be sufficiently enhanced. To the contrary, when the ratio of the average depth of the recessed portions 11 to the average thickness of the optical waveguide plate 3 is greater than the upper limit, desired optical characteristics may not be achieved.

Reflection Sheet

The reflection sheet 4 reflects toward the front face side, rays of light emitted from the back face side of the optical waveguide plate 3. The reflection sheet 4 is exemplified by: a white sheet in which a filler is contained to be dispersed in a base resin such as a polyester resin; a mirror sheet obtained by vapor deposition of a metal such as aluminum or silver on the surface of a film formed from a polyester resin or the like to enhance regular reflection properties; and the like.

Light Source

The light source 5 is disposed such that an emission surface thereof faces (or abuts) an end face of the optical waveguide plate 3. Various types of light sources can be used as the light source 5, and for example, light emitting diodes (LEDs) can be used. Specifically, a light source in which a plurality of light emitting diodes are arranged along the end face of the optical waveguide plate 3 may be used as the light source 5.

Light-Introducing Function

Figure 3A:
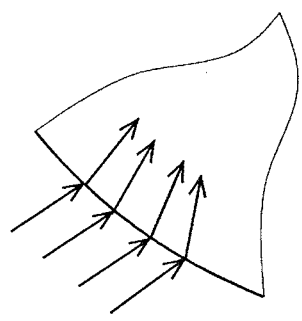
FIG. 3(a) is a diagram illustrating a light-introducing function of the optical sheet shown in FIG. 1.
Figure 3B:
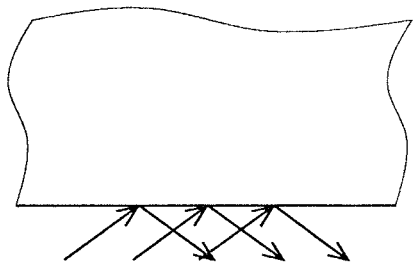
FIG. 3(b) is a diagram illustrating a light-introducing function of the optical sheet shown in FIG. 1.

With reference to FIGS. 3(*a*) and 3(*b*), the function of introducing the rays of light emitted from the front face of the optical waveguide plate 3 is explained. Since a plurality of light emitting diodes used as the light source 5 have great directivity, strong rays of light are emitted from the front face of the optical waveguide plate 3 along a given direction (for example, at an angle of about 600 with respect to the normal direction). The rays of light emitted from the front face of the optical waveguide plate 3 enter the back face of the optical sheet 2; however, according to conventional sticking-preventing layers, most of the strong rays of light propagating in the given direction described above are likely to be reflected on an interface on the sticking preventive layer (see FIG. 3(*b*)), and hence a luminous energy of a component along the normal direction among the rays of light emitted from the front face of the optical waveguide plate 3 shall be increased.

On the other hand, according to the sticking preventive portion 8 of the optical sheet 2, since the printed dots have a comparatively great average diameter, and are formed so as to have a comparatively smoothly curved face, e.g., to have a flattened hemisphere-like shape, the rays of light emitted from the front face of the optical waveguide plate 3 are likely to be introduced. More specifically, since the sticking preventive portion 8 has the given curved face on the back face thereof, many sites are included which are situated at an angle of about 900 with respect to the rays of light emitted from the front face of the optical waveguide plate 3 along a given direction, and thus the rays of light are less likely to be reflected on these sites. Therefore, the optical sheet 2 enables the strong rays of light emitted from the front face of the optical waveguide plate 3 along the given direction to be efficiently introduced by means of the sticking preventive portion 8 (see FIG. 3(*a*)).

Production Method of Optical Sheet

A method for producing the optical sheet 2 includes, for example: (1) applying a material for forming the light diffusion layer 7 on the front face of the substrate sheet 6, followed by drying and curing thereof to overlay the light diffusion layer 7 on the front face of the substrate sheet 6; and (2) applying a printed dots-forming ink on the back face of the substrate sheet 6 through a printing procedure such as screen printing, flexographic printing or offset printing, followed by drying and curing thereof to form the sticking preventive portion 8 on the back face of the substrate sheet 6.

Advantages

According to the optical sheet 2, since the sticking preventive portion 8 is provided on the back face of the substrate sheet 6, and the sticking preventive portion 8 includes a plurality of printed dots, the optical sheet 2 scatteredly abuts the optical waveguide plate 3 disposed on the back face side by way of the plurality of printed dots. Therefore, the sticking of the optical sheet 2 to the optical waveguide plate 3 disposed on the back face side can be prevented. Moreover, since the sticking of the optical sheet 2 is prevented by virtue of the plurality of printed dots, scratches of the front face of the optical waveguide plate 3 and the back face of the optical sheet 2, which may be caused by detachment of beads, can be inhibited, unlike conventional sticking preventive layers in which the beads are dispersed in a binder.

Since the optical sheet 2 includes the light diffusion layer 7 overlaid on the front face side of substrate sheet 6, and the light diffusion layer 7 contains the light diffusing agent 9 and the binder 10 for the light diffusing agent 9, the rays of light having entered from the back face side are enabled to be diffused and to exit from the front face side substantially uniformly.

Since the edge-lit backlight unit 1 includes the optical sheet 2, the sticking of the optical sheet 2 to the optical waveguide plate 3 disposed on the back face side can be prevented, as described above, and additionally scratches of the front face of the optical waveguide plate 3 can be inhibited. Moreover, since the scratch-inhibiting ability of the optical sheet 2 with respect to the front face of the optical waveguide plate 3 is improved, the edge-lit backlight unit 1 can improve handleability of the backlight unit during production thereof.

Second Embodiment

Optical Sheet

Figure 4:
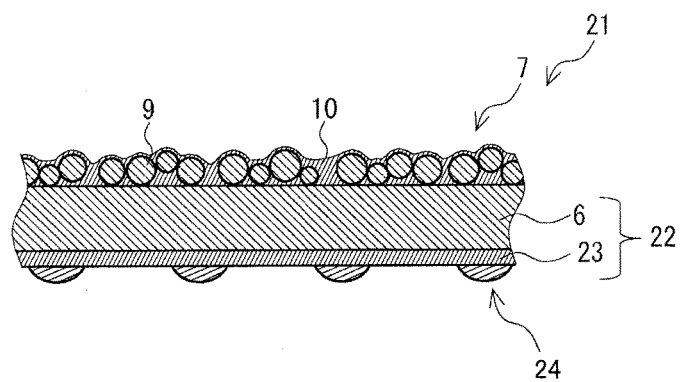
FIG. 4 is a schematic end view illustrating an optical sheet according to an embodiment other than the optical sheet shown in FIG. 1(b)
Figure 6A:
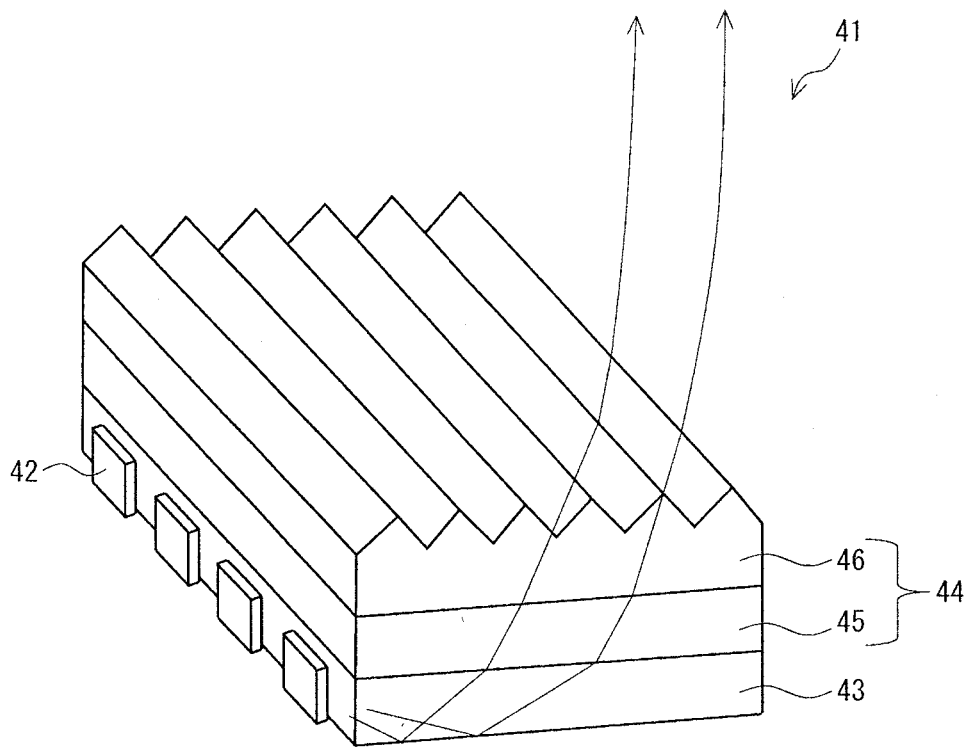
FIG. 6(a) is a schematic perspective view illustrating a conventional edge-lit backlight unit.
Figure 6B:
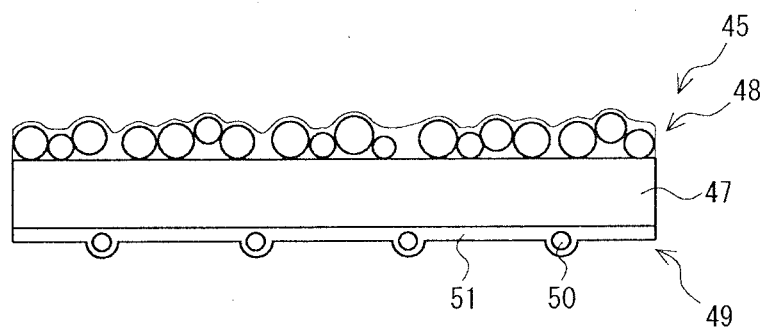
FIG. 6(b) is a schematic end view illustrating a conventional light diffusion sheet.

An optical sheet 21 shown in FIG. 4 may be used in the edge-lit backlight unit 1 in place of the optical sheet 2 shown in FIG. 1. The optical sheet 21 includes: a substrate sheet 22; a light diffusion layer 7 overlaid on the front face of the substrate sheet 22; and a sticking preventive portion 24 provided on the back face of the substrate sheet 22. The substrate sheet 22 includes: a substrate layer 6; and a functional layer overlaid on the back face of the substrate layer 6, and the printed dots described above are formed on the back face of the functional layer. In the present embodiment, the functional layer is an antistatic layer 23. More specifically, the substrate sheet 22 is formed so as to have a two-layer structure (multilayer structure) constituted with the substrate layer 6 and the antistatic layer 23 provided on the back face of the substrate layer 6. Since the substrate layer 6 is similar to the substrate sheet 6 shown in FIG. 1, explanation thereof is omitted through designating the identical number. In addition, the light diffusion layer 7 is similar to the optical sheet 2 shown in FIG. 1, and therefore explanation thereof is omitted through designating the identical number.

Antistatic Layer

The antistatic layer 23 is formed by applying a coating solution containing a binder component and an antistatic agent on the back face of the substrate layer 6, followed by curing. The binder component is not particularly limited, and examples thereof include the thermosetting resin or the active energy ray-curable resin and the like exemplified in connection with the binder component of the aforementioned printed dots-forming ink of the optical sheet 2 shown in FIG. 1. Moreover, the antistatic agent is not particularly limited, and examples thereof include: anionic antistatic agents such as alkylsulfuric acid salts and alkylphosphoric acid salts; cationic antistatic agents such as quaternary ammonium salts and imidazoline compounds; nonionic antistatic agents such as polyethylene glycol-based antistatic agents, polyoxyethylene sorbitan monostearic acid esters and ethanolamides; polymeric antistatic agents such as polyacrylic acid; and the like.

The lower limit of the amount of the antistatic agent based on the solid content with respect to 100 parts by mass of the binder component for forming the antistatic layer 23 is preferably 0.5 parts by mass, more preferably 1 part by mass, and still more preferably 1.5 parts by mass. On the other hand, the upper limit of the amount of the antistatic agent based on the solid content with respect to 100 parts by mass of the binder component is preferably 5 parts by mass, more preferably 4 parts by mass, and still more preferably 3 parts by mass. When the content of the antistatic agent is less than the lower limit, sufficient antistatic effects may not be exhibited. To the contrary, when the content of the antistatic agent is greater than the upper limit, disadvantages such as a decrease of the total light transmittance and/or deterioration of the strength of the antistatic layer 23, and the like may be caused due to the incorporation of the antistatic agent.

The upper limit of the surface resistance of the antistatic layer 23 is preferably $1 \times 10^{12} \Omega/\square$, more preferably $1 \times 10^{11} \Omega/\square$, and still more preferably $1 \times 10^{10} \Omega/\square$. When the surface resistance of the antistatic layer 23 is greater than the upper limit, attachment of an unwanted substance may not be accurately prevented. It is to be noted that the lower limit of the surface resistance of the antistatic layer 23 is not particularly limited, and may be $1 \times 10^{8} \Omega/\square$, for example.

The procedure for applying the coating solution on the back face of the substrate layer 6 is not particularly limited, and may be exemplified by a procedure involving a use of a roll coater, a kiss-roll coater, a bar coater, a blade coater, a gravure roll coater or the like. The procedure for applying the coating solution on the back face of the substrate layer 6 is also exemplified by spraying, immersion, and the like.

The lower limit of the amount of the coating solution applied (based on the solid content) is preferably 0.01 $g/m^2$, and still more preferably 0.05 $g/m^2$. On the other hand, the upper limit of the amount of the coating solution applied (based on the solid content) is preferably 0.5 $g/m^2$, and still more preferably 0.1 $g/m^2$. When the amount of the coating solution applied is less than the lower limit, sufficient antistatic effects may not be achieved. To the contrary, when the amount of the coating solution applied is greater than the upper limit, disadvantages such as a decrease of the total light transmittance, deterioration of printing adhesiveness, and contamination of other member by chemicals may be caused due to the application of the antistatic agent.

Sticking Preventive Portion

The sticking preventive portion 24 is formed so as to have a shape, size and the like similar to those of the sticking preventive portion 8 shown in FIG. 1. In addition, an ink similar to the printed dots-forming ink of the optical sheet 2 shown in FIG. 1 may be used as a material for forming the sticking preventive portion 24.

Advantages

According to the optical sheet 21, the substrate sheet 22 includes: the substrate layer 6; and the functional layer overlaid on the back face of the substrate layer 6, and the printed dots are provided on the back face of the functional layer. Since the substrate layer 6 has the functional layer provided on the back face thereof, and is not directly exposed, scratches of the substrate layer 6 can be inhibited.

According to the optical sheet 21, since the functional layer 23 is the antistatic layer 23, scratches of the front face of the optical waveguide plate 3 and the like due to attachment of an unwanted substance can be inhibited, whereby the scratch-inhibiting ability can be further improved.

Third Embodiment

Optical Sheet

An optical sheet 31 shown in FIG. 5 is formed as an optical waveguide sheet for use in an edge-lit backlight unit that emits toward the front face thereof, rays of light having entered from an end face. The optical sheet 31 may be used in the edge-lit backlight unit 1 in place of the optical waveguide plate 3 shown in FIG. 1. Moreover, in the edge-lit backlight unit, other optical sheet disposed on the front face side of the optical sheet 31 is not particularly limited, and examples thereof include a light diffusion sheet, a prism sheet, and the like.

The optical sheet 31 includes: a substrate sheet 32; and a sticking preventive portion 33 provided on the back face of the substrate sheet 32.

Substrate Sheet

The substrate sheet 32 is formed so as to be a plate having a substantially uniform thickness. The lower limit of the average thickness of the substrate sheet 32 is preferably 100 μm, more preferably 150 μm, and still more preferably 200 μm. On the other hand, the upper limit of the average thickness of the substrate sheet 32 is preferably 600 μm, more preferably 500 μm, and still more preferably 400 μm. When the average thickness of the substrate sheet 32 is less than the lower limit, the strength of the substrate sheet 32 may be insufficient, and the rays of light from the light source 5 may not sufficiently enter the substrate sheet 32. To the contrary, when the average thickness of the substrate sheet 32 is greater than the upper limit, it may be difficult to satisfy a requirement of a reduction in thickness of the backlight unit 1.

The lower limit of the required light guide distance of the substrate sheet 32 from the end face thereof on the light source 5 side is preferably 7 cm, more preferably 9 cm, and still more preferably 11 cm. On the other hand, the upper limit of the required light guide distance of the substrate sheet 32 from the end face thereof on the light source 5 side is preferably 25 cm, more preferably 23 cm, and still more preferably 21 cm. When the required light guide distance is less than the lower limit, the substrate sheet 32 may not be able to be used in larger size terminals other than small-size mobile terminals. To the contrary, when the required light guide distance is greater than the upper limit, bending is likely to occur in the use of the substrate sheet 32 as a thin optical waveguide sheet having an average thickness of no greater than 600 μm, and additionally sufficient light guiding properties may not be exhibited. It is to be noted that the required light guide distance of the substrate sheet 32 from the end face thereof on the light source 5 side as referred to means a distance which the rays of light emitted from the light source 5 and having entered the end face of the substrate sheet 32 need to travel from the end face toward the opposed end face. Specifically, for example, for unilateral edge-lit backlight units, the required light guide distance of the substrate sheet 32 from the end face thereof on the light source 5 side as referred to means a distance from the end face of the substrate sheet on the light source side to the opposed end face, whereas for bilateral edge-lit backlight units, the required light guide distance means a distance from the end face of the substrate sheet on the light source side to the central portion.

The lower limit of the surface area of the substrate sheet 32 is preferably 150 $cm^2$, more preferably 180 $cm^2$, and still more preferably 200 $cm^2$. On the other hand, the upper limit of the surface area of the substrate sheet 32 is preferably 840 $cm^2$, more preferably 760 $cm^2$, and still more preferably 720 $cm^2$. When the surface area of the substrate sheet 32 is less than the lower limit, the substrate sheet 32 may not be able to be used in larger size terminals other than small-size mobile terminals. To the contrary, when the surface area of the substrate sheet 32 is greater than the upper limit, bending is likely to occur in the use of the substrate sheet 32 as a thin optical waveguide sheet having an average thickness of no greater than 600 μm, and additionally sufficient light guiding properties may not be exhibited.

Since the substrate sheet 32 needs to transmit rays of light, the substrate sheet 32 is formed from a transparent, in particular colorless and transparent, synthetic resin as a principal component. The principal component of the substrate sheet 32 is similar to the principal component of the optical waveguide plate 3.

A wave-like finely modulated structure is provided on the front face of the substrate sheet 32. In addition, a ridge direction of the wave-like finely modulated structure is substantially parallel to the end face which the rays of light are to enter. Thus, the ridge direction of the finely modulated structure is substantially perpendicular to the travelling direction of the rays of light propagating through the substrate sheet 32, and hence light emission properties from the front face of the optical sheet 31 are improved due to variation of angles of incidence of rays of light onto the front face by virtue of the wave-like finely modulated structure.

The lower limit of the interval between the ridges (hereinafter, may be also referred to as "ridge interval") p in the finely modulated structure is preferably 1 mm, more preferably 10 mm, and still more preferably 20 mm. On the other hand, the upper limit of the ridge interval p in the finely modulated structure is preferably 500 mm, more preferably 100 mm, and still more preferably 60 mm. When the ridge interval p is less than the lower limit, the rays of light may be excessively emitted from the front face of the optical sheet 31. On the other hand, when the ridge interval p is greater than the upper limit, the effect of improving the light emission properties of the optical sheet 31 may not be satisfactory. It is to be noted that although all the intervals between the ridges (ridge intervals) p in the finely modulated structure preferably fall within the above range, a part of a plurality of ridge intervals p in the finely modulated structure may not fall within the above range, and in this case, it is desired that no less than 50%, preferably no less than 70%, of the plurality of ridge intervals p fall within the above range.

Moreover, the lower limit of the average height of the ridges with respect to an approximate hypothetical plane of the finely modulated structure on which a plurality of valley lines run is preferably 5 μm, more preferably 7 μm, and still more preferably 9 μm. On the other hand, the upper limit of the average height of the ridges with respect to an approximate hypothetical plane of the finely modulated structure on which a plurality of valley lines run is preferably 40 μm, more preferably 20 μm, and still more preferably 15 μm. When the average height of the ridges is less than the lower limit, the effect of improving the light emission properties of the optical sheet 31 may not be satisfactory. To the contrary, when the average height of the ridges is greater than the upper limit, the rays of light may be excessively emitted from the front face of the optical sheet 31.

Sticking Preventive Portion

The sticking preventive portion 33 is constituted with a plurality of printed dots. The sticking preventive portion 33 is formed by a printing procedure using a printed dots-forming ink containing a binder component. The binder component is similar to the binder component of the sticking preventive portion 8 shown in FIG. 2. The printing procedure is similar to the printing procedure employed in forming the sticking preventive portion 8 shown in FIG. 2. Moreover, in regard to the printed dots, the shape, the average diameter, the average height, the height ratio of the average height to the average diameter, the average pitch, and the arrangement density on the back face of the substrate sheet 32 may be similar to those of the sticking preventive portion 8 shown in FIG. 2.

The printed dots preferably contain a white pigment in a dispersion state. When the printed dots contains the white pigment in a dispersion state, the optical sheet 31 allows the rays of light having entered from an end face to propagate through the substrate sheet 32, to be efficiently diffused by means of the plurality of printed dots, and to exit from the front face side.

The white pigment is not particularly limited, and examples thereof include titanium oxide (titanium white), silica, calcium carbonate (chalk), zinc oxide (zinc white), lead carbonate (lead white), barium sulfate, and the like.

The lower limit of the mean particle diameter of the white pigment is preferably 100 nm, and more preferably 200 nm. On the other hand, the upper limit of the mean particle diameter of the white pigment is preferably 20 μm, and more preferably 10 μm. When the mean particle diameter of the white pigment is less than the lower limit, sufficient reflection performances may not be achieved. To the contrary, when the mean particle diameter of the white pigment is greater than the upper limit, dispersibility thereof may be deteriorated.

The lower limit of the content (i.e., amount based on the solid content) of the white pigment is preferably 70% by mass, and more preferably 80% by mass. On the other hand, the upper limit of the content of the white pigment (based on the solid content) is preferably 100% by mass, and more preferably 90% by mass. When the content of the white pigment is less than the lower limit, sufficient reflection performances may not be achieved. To the contrary, when the content of the white pigment is greater than the upper limit, it may be difficult to form the printed dots.

Production Method of Optical Sheet

A method for producing the optical sheet 31 includes, for example: (1) forming the substrate sheet 32 through extrusion molding; (2) forming the finely modulated structure using a T-die having a cross-sectional shape having a reversal shape of a vertical cross-sectional shape of the ridge of the finely modulated structure; and (3) applying on the back face of the substrate sheet 32, a printed dots-forming ink that contains the white pigment, through a printing procedure such as screen printing, flexographic printing or offset printing, followed by curing to form the sticking preventive portion 33.

Advantages

Since the optical sheet 31 is an optical waveguide sheet for use in an edge-lit backlight unit, the optical sheet 31 can prevent the sticking thereof to other member such as a reflection sheet or a top plate disposed on the back face side of the optical sheet 31. Moreover, according to the optical sheet 31, since the sticking is prevented by virtue of the plurality of printed dots, scratches of the front face of the reflection sheet, the top plate or the like, which may be caused by detachment of beads, can be inhibited, unlike conventional sticking preventive layers in which the beads are dispersed in a binder. Moreover, since the optical sheet 31 includes the sticking preventive portion 33 constituted with the plurality of printed dots, scratches of the optical sheet 31 itself can be inhibited, whereby deterioration of the light guiding properties can be easily and certainly inhibited.

According to the backlight unit, since the optical sheet 31 abuts a reflection sheet, a top plate or the like disposed on the back face of the optical sheet 31 by way of the plurality of printed dots, and hence the sticking of the optical sheet 31 on the back face thereof can be prevented. Moreover, according to the backlight unit, since the optical sheet 31 abuts the reflection sheet, the top plate or the like by way of the plurality of printed dots, scratches of the reflection sheet, the top plate or the like as well as the optical sheet 31 itself can be inhibited, whereby the deterioration of the light guiding properties can be easily and certainly inhibited.

Other Embodiments

It is to be noted that the optical sheet and the edge-lit backlight unit according to the embodiments of the present invention may be exploited in various modified or improved embodiments other than those as described above. For example, other layer(s) may be provided between the substrate layer and the light diffusion layer, between the substrate layer and the sticking preventive portion, on the front face of the light diffusion layer, etc. In addition, in a case where the substrate sheet includes the substrate layer, and other functional layer provided on the back face of the substrate layer, the other functional layer may be a hard coat layer or the like, for example.

The reflection sheet may not necessarily be disposed on the back face side of the optical waveguide plate or the optical waveguide sheet, and the optical waveguide plate or the optical waveguide sheet may be directly disposed on the top plate (an inner face of a casing of liquid crystal display devices). In a case where the optical waveguide plate or the optical waveguide sheet is directly disposed on the top plate, the top plate is preferably formed of, for example, a plate member made from aluminum or the like, and the front face of the top plate is preferably formed so as to function as a reflecting surface.

Moreover, in a case where the optical sheet is formed as the optical waveguide sheet, the optical sheet may not necessarily have the finely modulated structure. Furthermore, in a case where the optical sheet has the finely modulated structure, the ridge direction of the finely modulated structure may be substantially perpendicular to the end face which the rays of light are to enter. Thus, when the rays of light propagating through the optical sheet are reflected on the front face, a travelling direction of a part of the rays of light shifts to the ridge side, whereby the rays of light are likely to be condensed along the ridge direction. Moreover, in addition to this, the rays of light exiting from the front face are diffused to some extent along a direction perpendicular to the ridge direction of the wave-like finely modulated structure through refraction on the wave-like finely modulated structure, whereby the diffusing properties of the outgoing rays of light may be improved.

The lower limit of the ridge interval of the finely modulated structure is preferably 1 mm, more preferably 10 mm, and still more preferably 20 mm. On the other hand, the upper limit of the ridge interval of the finely modulated structure is preferably 500 mm, more preferably 100 mm, and still more preferably 60 mm. When the ridge interval does not fall within the above range, the rays of light propagating through the optical sheet are less likely to be condensed along the ridge direction. It is to be noted that although all ridge intervals in the finely modulated structure preferably fall within the above range, a part of a plurality of ridge intervals in the finely modulated structure may not fall within the above range, and in this case, it is desired that no less than 50%, preferably no less than 70%, of the plurality of ridge intervals fall within the above range.

Moreover, the lower limit of the average height of the ridges with respect to an approximate hypothetical plane of the finely modulated structure on which a plurality of valley lines run is preferably 5 μm, more preferably 7 μm, and still more preferably 9 μm. On the other hand, the upper limit of the average height of the ridges with respect to an approximate hypothetical plane of the finely modulated structure on which a plurality of valley lines run is preferably 40 μm, more preferably 20 μm, and still more preferably 15 μm. When the average height does not fall within the above range, the rays of light propagating through the optical sheet are less likely to be condensed along the ridge direction.

The edge-lit backlight unit according to the embodiments of the present invention can be used in various liquid crystal display devices, e.g.: laptop computers; mobile phone terminals such as smartphones; personal digital assistants such as tablet terminals; and the like.

As described in the foregoing, the optical sheet and the edge-lit backlight unit including the same according to the present invention enable scratches of the optical sheet and/or other member disposed on the back face side of the optical sheet to be inhibited, while the sticking of the optical sheet to the other member is prevented. Therefore, these can be suitably used in liquid crystal display devices in which lack in uniformity of the luminance is inhibited.

EXPLANATION OF THE REFERENCE SYMBOLS 1 edge-lit backlight unit
2 optical sheet
3 optical waveguide plate
4 reflection sheet
5 light source
6 substrate sheet (substrate layer)
7 light diffusion layer
8 sticking preventive portion
9 light diffusing agent
10 binder
11 recessed portion
21 optical sheet
22 substrate sheet
23 antistatic layer
24 sticking preventive portion
31 optical sheet
32 substrate sheet
33 sticking preventive portion
41 edge-lit backlight unit
42 light source
43 optical waveguide plate
44 optical sheet
45 light diffusion sheet
46 prism sheet
47 substrate layer
48 light diffusion layer
49 sticking preventive layer
50 beads
51 binder

The invention claimed is:

1. An optical sheet comprising:
a transparent substrate sheet;
a sticking preventive portion provided on a back face of the transparent substrate sheet; and
a light diffusion layer overlaid on a front face side of the substrate sheet, wherein
the light diffusion layer comprises a light diffusing agent and a binder for the light diffusing agent, and the sticking preventive portion comprises a plurality of printed dots, and wherein the printed dots are formed so as to be substantially circular when viewed from a back face side and each have a flattened hemisphere-like shape in which a ratio of an average height to an average diameter of the printed dots is no less than 1/100 and no greater than 1/2, the average height of the printed dots is greater than a mean particle diameter of the light diffusing agent, and the average diameter of the printed dots is no less than twice and no greater than twenty times the mean particle diameter of the light diffusing agent.

2. The optical sheet according to claim 1, wherein the average diameter of the printed dots is no less than 1 μm and no greater than 200 μm.

3. The optical sheet according to claim 1, wherein an arrangement density of the printed dots on the back face of the transparent substrate sheet is no less than 10 dots/mm² and no greater than 2,500 dots/mm².

4. The optical sheet according to claim 1, wherein a principal component of the printed dots is an acrylic resin, a urethane resin or an acrylic urethane resin.

5. The optical sheet according to claim 1, wherein the transparent substrate sheet comprises: a substrate layer; and a functional layer provided on a back face of the substrate layer, wherein the printed dots are provided on a back face of the functional layer.

6. The optical sheet according to claim 5, wherein the functional layer is an antistatic layer.

7. An edge-lit backlight unit comprising: the optical sheet according to claim 1; and an optical waveguide plate disposed on a back face side of the optical sheet.

8. The backlight unit according to claim 7, wherein the optical waveguide plate comprises a plurality of recessed portions provided substantially parallel on a front face thereof.

9. The backlight unit according to claim 8, wherein the average diameter of the printed dots is no less than an average width of the recessed portions.

* * * * *